US010309429B2

United States Patent
Gomm et al.

(10) Patent No.: US 10,309,429 B2
(45) Date of Patent: Jun. 4, 2019

(54) METHOD OF INCREASING ELECTRO-HYDROSTATIC ACTUATOR PISTON VELOCITY

(71) Applicant: Parker-Hannifin Corporation, Cleveland, OH (US)

(72) Inventors: Ralf Gomm, Charlotte, NC (US); Bjorn Eriksson, Johanneshov (SE)

(73) Assignee: Parker Hannifin Corporation, Cleveland, OH (US)

( * ) Notice: Subject to any disclaimer, the term of this patent is extended or adjusted under 35 U.S.C. 154(b) by 728 days.

(21) Appl. No.: 14/786,368

(22) PCT Filed: Apr. 22, 2014

(86) PCT No.: PCT/US2014/034980
§ 371 (c)(1),
(2) Date: Oct. 22, 2015

(87) PCT Pub. No.: WO2014/176252
PCT Pub. Date: Oct. 30, 2014

(65) Prior Publication Data
US 2016/0076558 A1    Mar. 17, 2016

Related U.S. Application Data

(60) Provisional application No. 61/814,411, filed on Apr. 22, 2013.

(51) Int. Cl.
    *F15B 11/08*   (2006.01)
    *F15B 13/044*  (2006.01)
    *F15B 7/00*    (2006.01)

(52) U.S. Cl.
    CPC ............ *F15B 13/044* (2013.01); *F15B 7/006* (2013.01); *F15B 11/08* (2013.01);
    (Continued)

(58) Field of Classification Search
    CPC ........ F15B 13/044; F15B 7/006; F15B 11/08; F15B 2211/27; F15B 21/14
    See application file for complete search history.

(56) References Cited

U.S. PATENT DOCUMENTS 6,460,332 B1 * 10/2002 Maruta ................. E02F 9/2075
                                                           60/414
6,912,849 B2    7/2005 Inoue et al.
(Continued)

FOREIGN PATENT DOCUMENTS

CN        101370987 A       2/2009
DE    10 2008 034301 A1     6/2009
(Continued)

OTHER PUBLICATIONS

International Search Report for corresponding patent application No. PCT/US2014/034980 dated Aug. 25, 2014.
(Continued)

*Primary Examiner* — Abiy Teka
(74) *Attorney, Agent, or Firm* — Renner, Otto, Boisselle & Sklar, LLP

(57) ABSTRACT

Provided is a system and method to generate and control hydraulic fluid flow that exceeds the fluid flow capacity of an electrically driven pump to achieve high actuator retraction/extension speeds and/or electrical flow capacity of an electrical storage system to better control electrical storage. Electric machines and hydraulic pumps generally have a maximum speed beyond which they cannot be operated at. Further, electrical storage systems typically have storage capacities and rates beyond which they cannot be operated at. While an alternate approach could be to increase the hydraulic pump displacement, thus lowering the required electric machine and pump speed to generate a certain flow, it is typically desirable to reduce pump displacement in order to reduce required electric machine torque and minimize component size and losses.

39 Claims, 6 Drawing Sheets

(52) U.S. Cl.
CPC ............ *F15B 2211/20515* (2013.01); *F15B 2211/20561* (2013.01); *F15B 2211/27* (2013.01); *F15B 2211/3058* (2013.01); *F15B 2211/30515* (2013.01); *F15B 2211/40515* (2013.01); *F15B 2211/41581* (2013.01); *F15B 2211/613* (2013.01); *F15B 2211/6346* (2013.01); *F15B 2211/7053* (2013.01); *F15B 2211/785* (2013.01); *Y02P 80/13* (2015.11)

(56) References Cited

U.S. PATENT DOCUMENTS

| | | | |
|---|---|---|---|
| 7,234,298 | B2 | 6/2007 | Brinkman et al. |
| 9,938,691 | B2* | 4/2018 | Hiraku .................... F15B 11/17 |
| 2003/0097837 | A1* | 5/2003 | Hiraki .................. E02F 9/2217 |
| | | | 60/486 |
| 2007/0166168 | A1 | 7/2007 | Vigholm et al. |
| 2012/0221212 | A1 | 8/2012 | Peterson et al. |
| 2013/0000292 | A1* | 1/2013 | Edler .................... F15B 11/055 |
| | | | 60/327 |

FOREIGN PATENT DOCUMENTS

| | | |
|---|---|---|
| DE | 10 2011 005337 A1 | 9/2012 |
| JP | S62 33947 A | 2/1987 |
| JP | 2009 196597 A | 9/2009 |
| KE | S57 144601 U | 9/1982 |

OTHER PUBLICATIONS

Written Opinion for corresponding patent application No. PCT/US2014/034980 dated Jul. 1, 2015.
Office Action and translation for corresponding Chinese Patent Application No. 201480035715.9 dated Aug. 16, 2016.

\* cited by examiner

METHOD OF INCREASING ELECTRO-HYDROSTATIC ACTUATOR PISTON VELOCITY

This application is a national phase of International Application No. PCT/US2014/034980 filed Apr. 22, 2014 and published in the English language.

RELATED APPLICATIONS

This application claims the benefit of U.S. Provisional Application No. 61/814,411 filed Apr. 22, 2013, which is hereby incorporated herein by reference.

FIELD OF INVENTION

The present invention relates generally to electro-hydrostatic actuation systems, and more particularly to systems and control algorithms for control of fluid flow through the pumps of such machines.

BACKGROUND

It is common for a work machine such as but not limited to hydraulic excavators, wheel loaders, loading shovels, backhoe shovels, mining equipment, industrial machinery and the like, to have one or more actuated components such as lifting and/or tilting arms, booms, buckets, steering and turning functions, traveling means, etc. Commonly, in such machines, a prime mover drives a hydraulic pump for providing fluid to the actuators. Open-center or closed-center valves control the flow of fluid to the actuators.

Some modern machines have replaced the traditional hydraulic system described above with an electro-hydrostatic actuator system (EHA). An electro-hydrostatic actuator includes a reversible, variable speed electric motor that is connected to a hydraulic pump, generally fixed displacement, for providing fluid to an actuator for controlling motion of the actuator. The speed and direction of the electric motor controls the flow of fluid to the actuator. Power for the electric motor is received from a power unit, for example a generator, a power storage unit, such as a battery, or both. At, for example, deceleration and/or lowering motion of a load, the power unit may receive power from the said electric motor that is then operated as a generator. A system that includes an electro-hydrostatic actuator is referred to herein as an electro-hydrostatic actuator system.

SUMMARY OF INVENTION

Provided is a system and method to generate and control hydraulic fluid flow that exceeds the fluid flow capacity of an electrically driven pump to achieve high actuator retraction/extension speeds and/or electrical flow capacity of an electrical storage system to better control electrical storage. Electric machines and hydraulic pumps generally have a maximum speed beyond which they cannot be operated at. Further, electrical storage systems typically have storage capacities and rates beyond which they cannot be operated at. While an alternate approach could be to increase the hydraulic pump displacement, thus lowering the required electric machine and pump speed to generate a certain flow, it is typically desirable to reduce pump displacement in order to reduce required electric machine torque and minimize component size and losses.

According to one aspect of the invention, a hydraulic system includes a controller connectable to an operator interface for receiving an operator input; a pump system including a pump operable in a first direction for supplying pressurized fluid; a hydraulic circuit having a first side fluidly connecting a first side of the pump to a first port to which a first port of a consumer can be connected and providing a path for flow between the port and the pump, and a second side fluidly connecting the second side of the pump to a second port to which a second port of the consumer can be connected; and a diverting flow path including a variable restriction controlled by the controller for controlling a rate of flow through the first side of the hydraulic circuit, wherein the diverting flow path diverts at least a portion of flow in the first side of the hydraulic circuit away from the pump, wherein the controller is configured to receive a requested user command from the operator interface, to evaluate the user command in relation to a maximum capacity of the pump system in response to the requested user command, and to control the pump and variable restriction to implement the user command based on the evaluation.

Optionally, the pump system includes an inverter.

Optionally, the pump system includes an electric machine driving the pump.

Optionally, the pump system includes electrical storage.

Optionally, the maximum capacity of the pump system is a maximum fluid flow rate, and wherein the variable restriction is opened in response to an evaluation in which the user command indicates a desired consumer movement corresponding to a flow rate greater than the maximum fluid flow rate of the pump system.

Optionally, the maximum capacity of the pump system is a maximum storage rate of an electrical storage system of the pump system that is operatively connected to the pump and is configured to recuperate energy from the pump being operated by an external load, and wherein the variable restriction is opened in response to an evaluation in which the user command indicates a desired consumer movement corresponding to a storage rate greater than the maximum storage rate of the electrical storage system.

Optionally, the maximum capacity of the pump system is a maximum storage capacity of an electrical storage system of the pump system that is operatively connected to the pump and is configured to recuperate energy from the pump being operated by an external load, and wherein the variable restriction is opened in response to an evaluation in which the user command indicates a desired consumer movement corresponding to a storage capacity greater than the maximum storage capacity of the electrical storage system.

Optionally, the diverting flow path fluidly connects the first port to the second port.

Optionally, the diverting flow path fluidly connects the first port to a boost system.

Optionally, the diverting flow path fluidly connects the first port to tank.

Optionally, the hydraulic system includes valving fluidly connected between the pump and the ports, the valving controlled by the controller and operative to regulate the pressurized fluid between the pump and the consumer.

Optionally, the valving includes a first load holding valve disposed between the first port and the pump, and a second load holding valve disposed between the second port and the pump.

Optionally, the diverting flow path is fluidly parallel with and thereby bypasses the first load holding valve.

Optionally, the diverting flow path is fluidly parallel with and thereby bypasses the second load holding valve.

Optionally, the user command is a command for lowering an actuator.

Optionally, the pump is a bi-directional pump operable in a first direction for supplying pressurized fluid through the first valve to the consumer for operating the consumer in one direction, and operable in a second direction opposite the first direction for supplying pressurized fluid through a second valve to the consumer for operating the consumer in a direction opposite the first direction.

Optionally, the hydraulic system includes a hydraulic actuator to and from which hydraulic fluid is supplied and returned in opposite directions to operate the actuator in opposite directions.

Optionally, the hydraulic system includes a boost system for accepting fluid from or supplying fluid to the hydraulic circuit of the hydraulic system. The boost system may include a boost pump for supplying fluid to a fluid make-up/return line that selectively is in fluid communication with the consumer, and a boost electric machine for driving the boost pump, the electric machine connected to a boost electric power source through a boost inverter.

Optionally, the hydraulic system includes an electric machine operated by the controller and connected to an electrical source through an inverter to drive the pump.

According to another aspect of the invention, a method of controlling fluid flow through the pump in an electro-hydraulic system includes receiving a requested user command for a consumer; evaluating the user command in relation to a maximum capacity of the an electro-hydraulic system in response to the requested user command; diverting flow around the pump to implement the user command based on the evaluation via a variable restrictor of a diverting flow path.

Optionally, the maximum capacity of the electro-hydraulic system is a maximum fluid flow rate through the pump, and wherein the diverting is in response to an evaluation in which the user command indicates a desired consumer movement corresponding to a flow rate greater than the maximum fluid flow rate of the electro-hydraulic system.

Optionally, the maximum capacity of the electro-hydraulic system is a maximum storage rate of an electrical storage system of the electro-hydraulic system that is operatively connected to the pump and is configured to recuperate energy from the pump being operated by an external load, and wherein the diverting is in response to an evaluation in which the user command indicates a desired consumer movement corresponding to a storage rate greater than the maximum storage rate of the electrical storage system.

Optionally, the maximum capacity of the electro-hydraulic system is a maximum storage capacity of an electrical storage system of the electro-hydraulic system that is operatively connected to the pump and is configured to recuperate energy from the pump being operated by an external load, and wherein the diverting is in response to an evaluation in which the user command indicates a desired consumer movement corresponding to a storage capacity greater than the maximum storage capacity of the electrical storage system.

Optionally, the diverting includes fluidly connecting the first port to the second port.

Optionally, the diverting includes fluidly connecting the first port to a boost system.

Optionally, the diverting includes fluidly connecting the first port to tank.

Optionally, the user command is a command for lowering an actuator

Optionally, the consumer is a hydraulic cylinder and the first side of the hydraulic circuit is fluidly connected to a rod-side of the hydraulic cylinder.

Optionally, the pump is a bi-directional pump operable in a first direction for supplying pressurized fluid through the first valve to the hydraulic actuator for operating the consumer in one direction, and operable in a second direction opposite the first direction for supplying pressurized fluid through a second valve to the hydraulic actuator for operating the consumer in a direction opposite the first direction.

Optionally, the consumer is a hydraulic actuator to and from which hydraulic fluid is supplied and returned in opposite directions to operate the actuator in opposite directions.

Optionally, the method includes accepting fluid from or supplying fluid to a hydraulic circuit of the electro-hydraulic system via a boost system, wherein the boost system includes a boost pump for supplying fluid to a fluid make-up/return line that selectively is in fluid communication with the hydraulic actuator, and a boost electric machine for driving the boost pump, the electric machine connected to a boost electric power source through a boost inverter.

Optionally, the method includes controlling valving fluidly connected between the pump and the ports to regulate the pressurized fluid between the pump and the consumer.

Optionally, the valving includes a load-holding valve connected between the pump and the first port, the load-holding valve controlled by the controller and operative in a first position to allow flow to the actuator to operate the actuator against a load and operative in a second position to block load-induced return flow from the actuator to the pump Optionally, the method includes operating the pump in one direction for supplying pressurized fluid to the hydraulic consumer for operating the consumer in a first direction, and operating the pump in a second direction opposite the first direction for supplying pressurized fluid to the consumer for operating the consumer in a direction opposite the first direction.

Optionally, the method includes driving the pump via an electric machine connected to an electrical source through an inverter.

According to another aspect of the invention, a hydraulic system includes a pump system including a pump operable in a first direction for supplying pressurized fluid; a hydraulic circuit having a first side fluidly connecting a first side of the pump to a first port to which a first port of a consumer can be connected and providing a path for flow between the port and the pump, and a second side fluidly connecting the second side of the pump to a second port to which a second port of the consumer can be connected; and a diverting flow path including a variable restriction for controlling a rate of flow through the first side of the hydraulic circuit, wherein the diverting flow path diverts at least a portion of flow in the first side of the hydraulic circuit to tank, wherein the variable restriction is variable as a function of a sensed system parameter.

Optionally, the sensed system parameter is a user command.

Optionally, the sensed system parameter is a pump age.

Optionally, the sensed system parameter is a pump type.

Optionally, the sensed system parameter is a pressure in the hydraulic circuit.

Optionally, the sensed system parameter is a torque of an electric machine.

Optionally, the sensed system parameter is a current in the inverter.

Optionally, the diverting flow path fluidly connects the first port to tank via a boost system.

Optionally, the diverting flow path fluidly connects the first port directly to tank.

Optionally, the hydraulic system includes a controller connected to an operator interface; wherein the controller is configured to receive a requested user command, to evaluate the user command in relation to a maximum capacity of the pump system in response to the requested user command, and to control the pump and variable restriction to implement the user command based on the evaluation.

Optionally, the maximum capacity of the pump system is a maximum fluid flow rate, and wherein the variable restriction is opened in response to an evaluation in which the user command indicates a desired consumer movement corresponding to a flow rate greater than the maximum fluid flow rate of the pump system.

Optionally, the maximum capacity of the pump system is a maximum storage rate of an electrical storage system of the pump system that is operatively connected to the pump and is configured to recuperate energy from the pump being operated by an external load, and wherein the variable restriction is opened in response to an evaluation in which the user command indicates a desired consumer movement corresponding to a storage rate greater than the maximum storage rate of the electrical storage system.

Optionally, the maximum capacity of the pump system is a maximum storage capacity of an electrical storage system of the pump system that is operatively connected to the pump and is configured to recuperate energy from the pump being operated by an external load, and wherein the variable restriction is opened in response to an evaluation in which the user command indicates a desired consumer movement corresponding to a storage capacity greater than the maximum storage capacity of the electrical storage system.

Optionally, the hydraulic system includes valving fluidly connected between the pump and the ports, the valving controlled by the controller and operative to regulate the pressurized fluid between the pump and the consumer.

Optionally, the valving includes a first load holding valve disposed between the first port and the pump, and a second load holding valve disposed between the second port and the pump.

Optionally, the diverting flow path is fluidly parallel with and thereby bypasses the first load holding valve.

Optionally, the diverting flow path is fluidly parallel with and thereby bypasses the second load holding valve.

Optionally, the user command is a command for lowering an actuator.

Optionally, the pump is a bi-directional pump operable in a first direction for supplying pressurized fluid through the first valve to the consumer for operating the consumer in one direction, and operable in a second direction opposite the first direction for supplying pressurized fluid through a second valve to the consumer for operating the consumer in a direction opposite the first direction.

Optionally, the hydraulic system includes a hydraulic actuator to and from which hydraulic fluid is supplied and returned in opposite directions to operate the actuator in opposite directions.

Optionally, the hydraulic system includes a boost system for accepting fluid from or supplying fluid to the hydraulic circuit of the hydraulic system. The boost system may include a boost pump for supplying fluid to a fluid make-up/return line that selectively is in fluid communication with the consumer, and a boost electric machine for driving the boost pump, the electric machine connected to a boost electric power source through a boost inverter.

Optionally, the hydraulic system includes an electric machine operated by the controller and connected to an electrical source through an inverter to drive the pump.

According to another aspect of the invention, a hydraulic system includes a controller connected to an operator interface; a first load holding valve operatively connected to the controller; and a pump operable in a first direction for supplying pressurized fluid through the first load holding valve; wherein the controller is configured to receive a requested actuator deceleration, to wait a prescribed period of time after receipt of the requested actuator deceleration, and to control the first load holding valve to close in response to the requested actuator deceleration.

Optionally, the pump is a bi-directional pump operable in a first direction for supplying pressurized fluid through a first load holding valve to a hydraulic actuator for operating the actuator in one direction, and operable in a second direction opposite the first direction for supplying pressurized fluid through a second holding valve to the hydraulic actuator for operating the actuator in a direction opposite the first direction, Optionally, the hydraulic system includes a hydraulic actuator to and from which hydraulic fluid is supplied and returned in opposite directions to operate the actuator in opposite directions.

Optionally, the hydraulic system includes a boost system for accepting fluid from or supplying fluid to a hydraulic circuit of the hydraulic system.

Optionally, the boost system includes a boost pump for supplying fluid to a fluid make-up/return line that selectively is in fluid communication with the hydraulic actuator, and a boost electric machine for driving the boost pump, the electric machine connected to a boost electric power source through a boost inverter.

Optionally, the pump is a bi-directional pump operable in a second direction opposite the first direction for supplying pressurized fluid through a second load holding valve.

Optionally, the hydraulic system includes an electric machine connected to an electrical source through an inverter to drive the pump.

According to another aspect of the invention, a method of controlling deceleration of an actuator in a hydraulic system includes receiving a requested deceleration rate of an actuator; waiting a prescribed period of time after and in response to receipt of the requested deceleration rate; and generating a control signal to close a first load holding valve in response to the requested deceleration rate Optionally, the method includes operating a bi-directional pump in one direction for supplying pressurized fluid through the first load holding valve to the hydraulic actuator for operating the actuator in a first direction, and operating the pump in a second direction opposite the first direction for supplying pressurized fluid through a second holding valve to the hydraulic actuator for operating the actuator in a direction opposite the first direction.

Optionally, the method includes supplying and returning hydraulic fluid to and from the hydraulic actuator in opposite directions to operate the actuator in opposite directions.

Optionally, the method includes accepting fluid from or supplying fluid to the hydraulic system via a boost system.

Optionally, the method includes supplying fluid to a fluid make-up/return line that selectively is in fluid communication with the hydraulic actuator via a boost pump, and driving the boost pump with an electric machine, the electric machine connected to a boost electric power source through a boost inverter.

Optionally, the pump is a bi-directional pump operable in a second direction opposite the first direction for supplying pressurized fluid through a second load holding valve.

Optionally, the method includes driving the pump via an electric machine connected to an electrical source through an inverter.

The foregoing and other features of the invention are hereinafter described in greater detail with reference to the accompanying drawings.

DETAILED DESCRIPTION

Exemplary embodiments of the invention relate generally to hydraulic actuation systems for controlling a hydraulic consumer such as, for example, extending and retracting at least one asymmetric hydraulic cylinder in a work machine, such as but not limited to hydraulic excavators, wheel loaders, loading shovels, backhoe shovels, mining equipment, industrial machinery and the like, having one or more actuated components such as lifting and/or tilting arms, booms, buckets, steering and turning functions, traveling means, etc.

The method is primarily suitable to control the movement of an actuator and associated machine function when such function is under an external load. The system has particular application in electro-hydrostatic actuation systems that typically include bi-directional electric motor driven pumps and asymmetric hydraulic actuators connected within closed circuits to provide work output against external loads and reversely recover energy from externally applied loads.

The method may achieve actuator retraction/extension speeds greater than maximum electric machine and hydraulic pump flow capability. Further, the method may reduce electrical energy recuperation when external loads are applied to an electro-hydrostatic actuator system by shifting the balance between electrical recuperation and hydraulic dissipation. This can be used to prevent the electrical power storage from becoming over-charged, or for other power management requirements such as preventing the need for having an electrical brake resistor.

Figure 1:
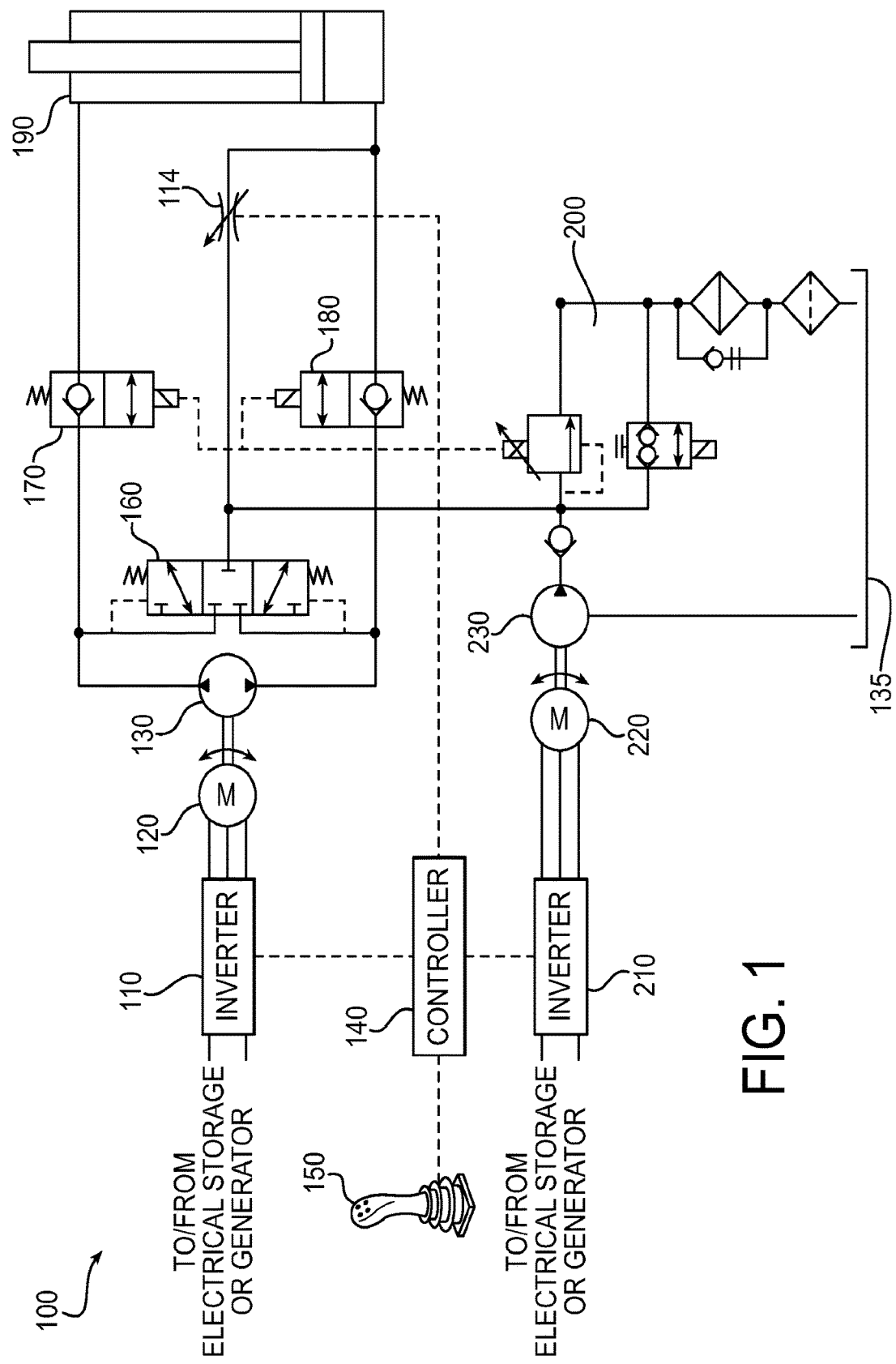
FIG. 1 illustrates an exemplary schematic electro-hydrostatic actuator system.

Referring in detail to FIG. 1, an exemplary embodiment of an electro-hydrostatic actuator system 100 is shown. The system includes at least one actuator 190 to be mechanically connected to a work machine and hydraulically connected to the system 100.

An inverter 110 may be connected to an electrical energy source or energy unit such as an electrical storage (e.g., one or more batteries) or a generator and controls an electric machine 120 (e.g., an electric motor) in bi-directional speed or torque control mode. The electric machine 120 may be mechanically coupled to and drive a hydraulic pump 130, which may be any appropriate type, but is generally a fixed displacement, variable speed pump. The inverter may also store energy generated by the electrical machine in the storage when the pump is back-driven by hydraulic fluid, for example, during a down motion of the actuator when under an external load.

The operator of the system may command a desired actuator speed or force through an input device such as a joystick 150 connected to a controller 140. In other embodiments, a separate command controller may generate the command signal that is passed to the controller 140, for example if the work machine is being remotely or autonomously controlled.

The controller 140 issues commands to the inverter 110 which in conjunction with the motor 120 and pump 130 allows generation of bi-directional flow and pressure via the hydraulic pump 130. The flow is then directed through load holding valves 170, 180 to the actuator 190 yielding the desired actuator motion.

FIG. 1 shows the load holding valves 170, 180 as being ON/OFF type valves, however either or both of these valves could also be flow-control valves, orifice valves or any other proportionally adjustable valve. Exemplary valves are poppet valves so as to prevent leakage through the valves when the valves are closed.

Because most mobile machinery uses un-balanced actuators with a large and small volume chamber, a flow management system 200, for example as presented in U.S. Patent Application Publication No. 2011/0030364 A1 (incorporated herein by reference), controlled by a second inverter 210 and second electric machine 220 and second hydraulic pump 230, provides whatever input flow required by the actuator pump 130 via the shuttle valve 160.

During an actuator extend motion to lift a load, the actuator pump 130 provides flow into the large volume of the actuator 190 (the piston side) and the flow management system 200 is connected to the actuator pump inlet via the shuttle valve 160, ensuring that the flow difference of large volume minus small volume (the rod side) is provided to the actuator pump 130.

During an actuator retraction motion to lower a load, the actuator pump 130 consumes flow from the large volume of the actuator 190 and the flow management system 200 is connected to the actuator pump outlet via the shuttle valve 160, diverting excess flow of large volume minus small volume back to the flow management system 200 and ultimately to the hydraulic reservoir 135.

Although the actuator depicted is a cylinder, it is contemplated that other actuators are possible. Further, the orientation of the cylinder may be reversed from that which is shown.

In general, when the operator does not command an actuator motion, both load holding valves 170, 180 may be closed to remove the hydraulic load from the pump, reduce consumption of electrical energy and prevent the load from dropping in case the pump drive source is turned off. This may cause the pressure between the load holding valves and pump to decay over time, largely due to leakage in the pump.

The pressure between the load holding valves and actuator, however, remains at a level to support the external load without actuator motion.

A diverting flow path that is operatively/fluidly parallel to the pump is controlled by a variable restriction (hydraulic valve) 114 through which a certain amount of hydraulic flow can be directed in order to divert flow around the actuator pump flow, thereby increasing the actuator speed beyond maximum electric machine and hydraulic pump flow capability.

Figure 2:
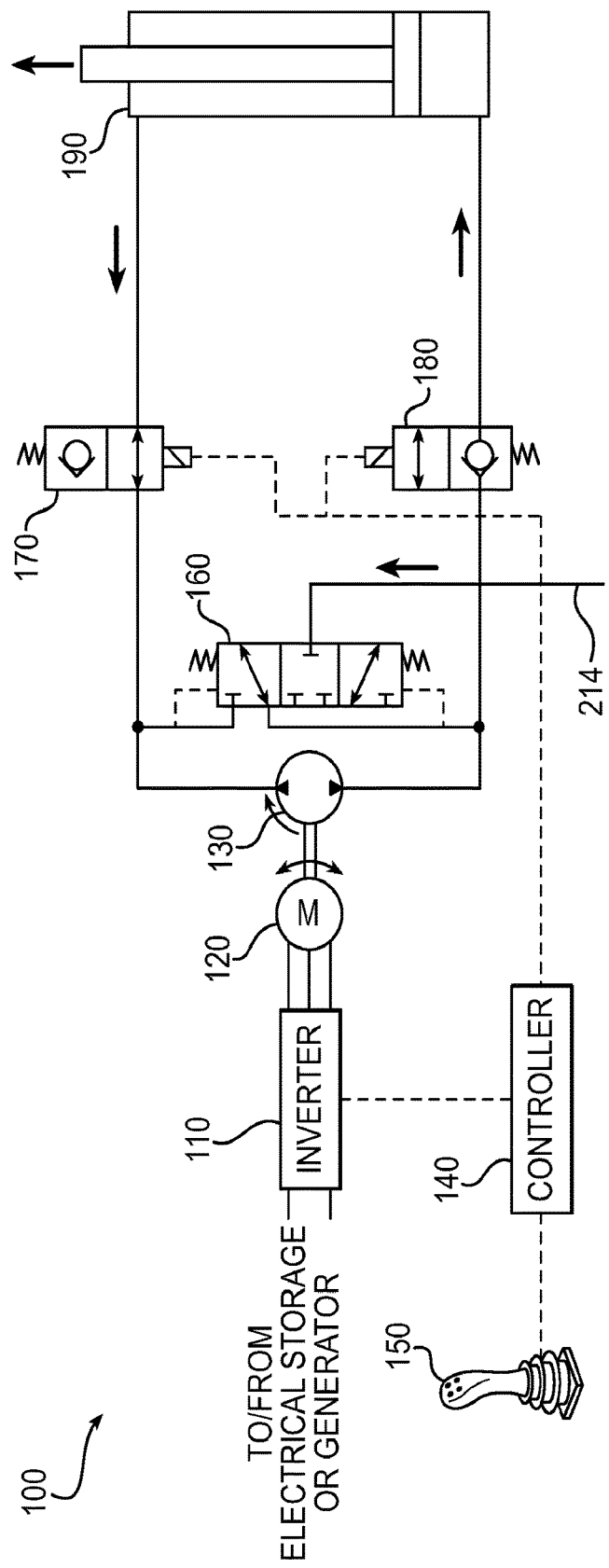
FIG. 2 illustrates an exemplary, simplified schematic embodiment of a system showing an actuator extension motion, direction of fluid flow indicated by arrows and load holding valve states to enable this motion.

Referring now in detail to FIG. 2, an exemplary embodiment of an electro-hydrostatic actuator system 100 is shown. The system is the same as that shown in FIG. 1, except that the flow management system 200 and the diverting flow path and valve 114 are omitted to focus on operation of the remaining system. Hydraulic connection 214 indicates the to/from connection to the flow management system 200 shown in FIG. 1.

Referring back to FIG. 2, the hydraulic actuator 190 is mechanically connected to a work machine and the arrow above the actuator is used to indicate the direction of motion: extension of the actuator. The remaining arrows indicate hydraulic fluid flow direction in the system.

In order to enable an actuator extension motion, load holding valve 170 needs to be commanded open as indicated to allow fluid flow from the small volume of the actuator back to the electrically driven pump 130. Load holding valve 180 does not have to be commanded open in this case, since the type of valve used in this example includes a check valve that will pass flow freely from pump 130 into the large volume of the actuator.

Figure 3:
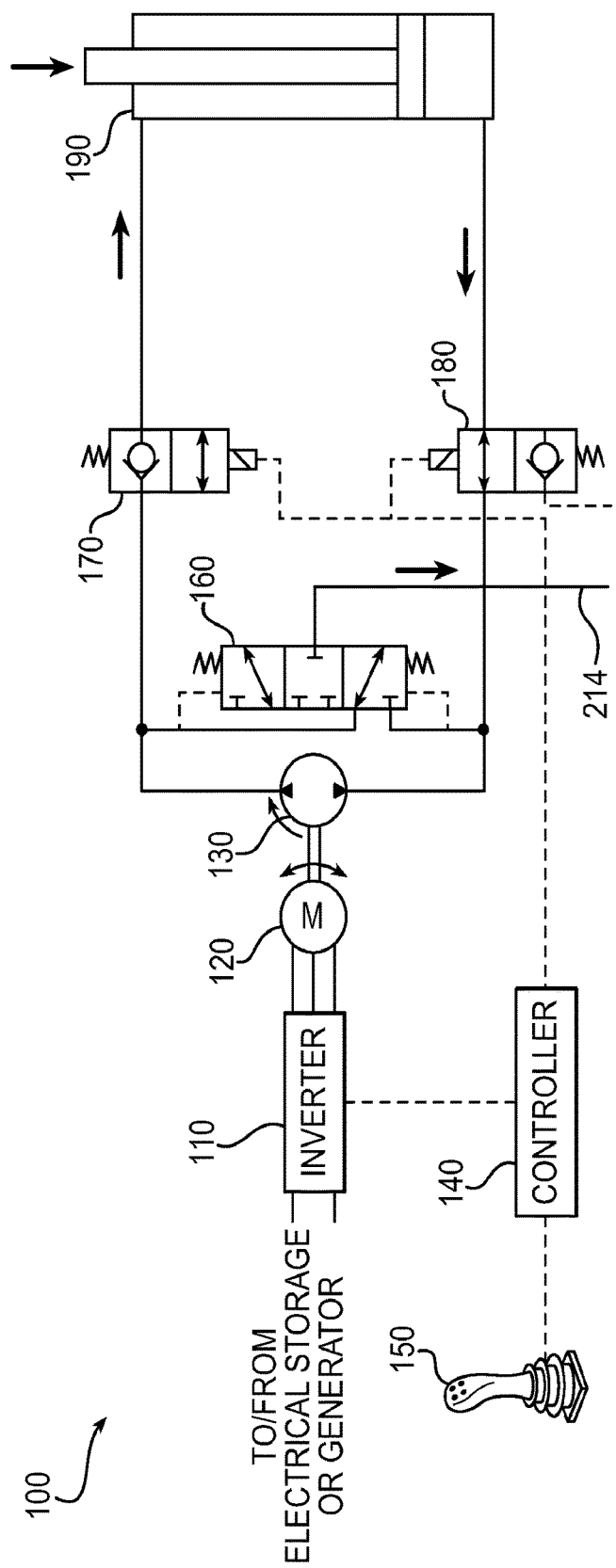
FIG. 3 illustrates an exemplary, simplified embodiment of a system showing an actuator retraction motion, direction of fluid flow indicated by arrows and load holding valve states to enable this motion.

Referring now in detail to FIG. 3, an exemplary embodiment of an electro-hydrostatic actuator system is shown. The system is the same as that shown in FIG. 1, except that the flow management system 200 and the diverting flow path and valve 114 are omitted to focus on operation of the remaining system. Hydraulic connection 214 indicates the to/from connection to the flow management system shown as item 200 in FIG. 1. The arrow above the actuator is used to indicate the direction of motion: retraction of the actuator.

In order to enable an actuator retraction motion, load holding valve 180 needs to be commanded open as indicated to allow fluid flow from the large volume of the actuator back to the electrically driven pump 130. Load holding valve 170 does not have to be commanded open in this case, since the type of valve used in this example includes a check valve that will pass flow freely from pump 130 into the large volume of the actuator.

Referring now to FIGS. 1-3, to increase the actuator speed beyond maximum electric machine and hydraulic pump flow capability, a controllable variable restriction (hydraulic valve) 114 is included through which a certain amount of hydraulic flow can be directed in order to bypass the actuator pump flow through a diverting flow path that may be operatively/fluidly parallel to the pump. The valve 114 could be a flow-control valve, an orifice valve or any other proportionally adjustable or on-off type valve.

Thus, when keeping the electric machine speed constant, for example at maximum, any additional hydraulic flow generated by opening valve 114 will cause the actuator speed to increase.

Another application example would be to reduce the electric machine speed in order to reduce the amount of electrical energy recuperated, and to open the valve 114 to generate the amount of flow by which the electric machine was reduced. Thus, the actuator speed can be kept constant while reducing the amount of electrical energy recuperated.

Combinations of these two application examples can easily be implemented based on operator commands and/or system state such as ability to absorb electrical energy.

Figure 4:
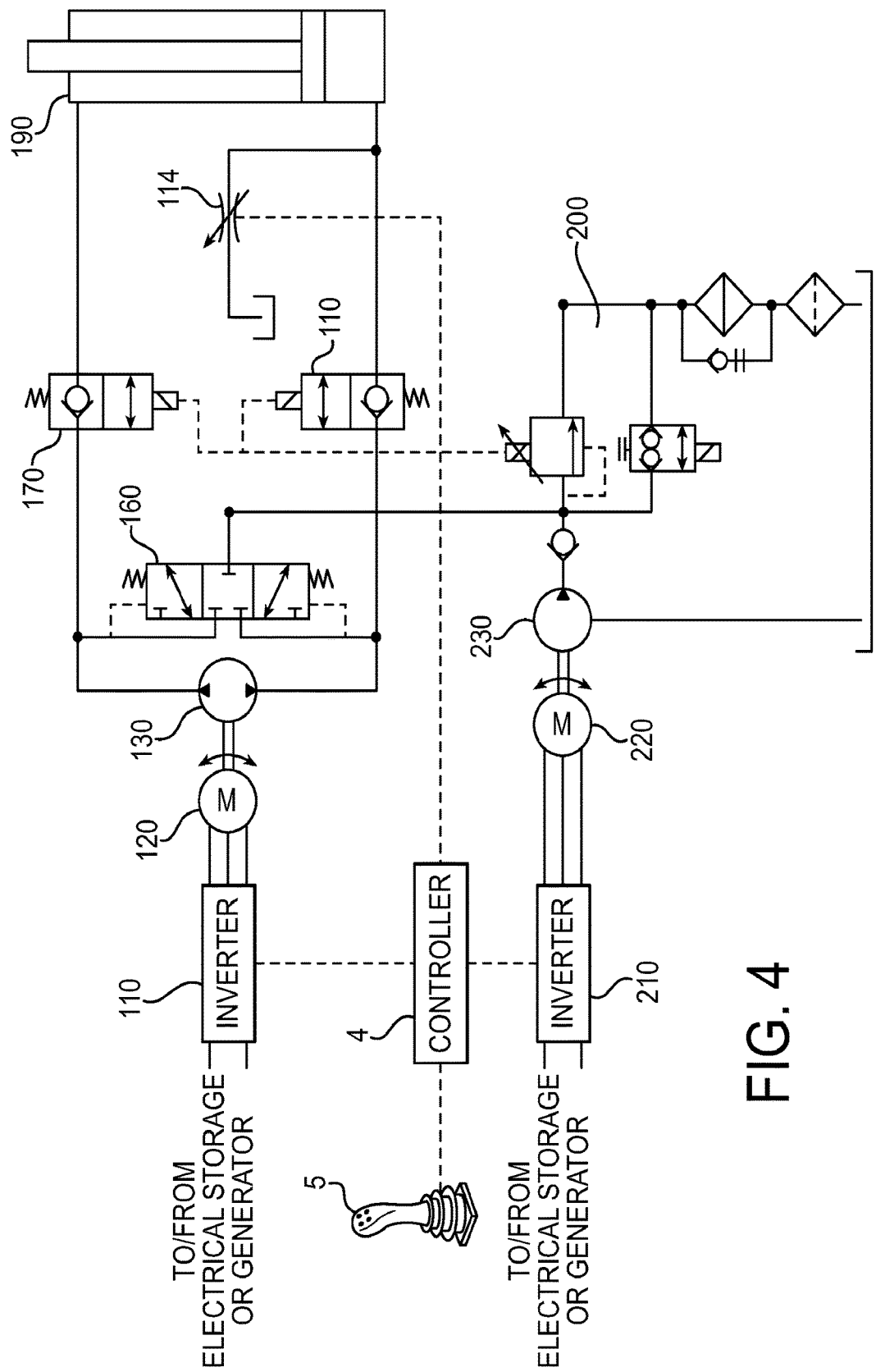
FIG. 4 illustrates another exemplary schematic electro-hydrostatic actuator system.

Referring now in detail to FIG. 4, an exemplary embodiment of an electro-hydrostatic actuator system is shown. The system is the same as that shown in FIG. 1, except that the diverting flow path connects the actuator to tank directly rather than through the boost system described above.

Figure 5:
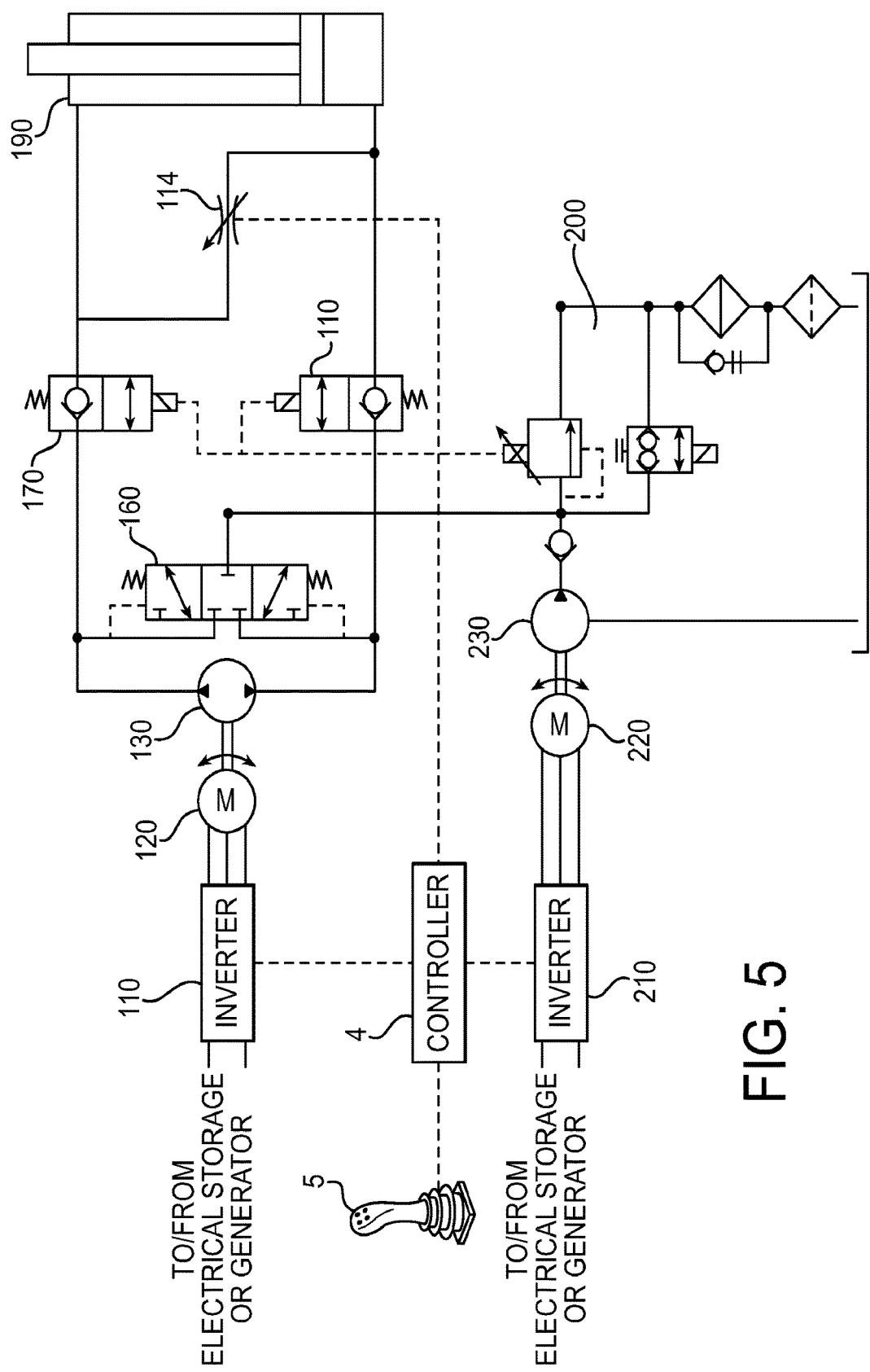
FIG. 5 illustrates another exemplary schematic electro-hydrostatic actuator system.

Referring now in detail to FIG. 5, an exemplary embodiment of an electro-hydrostatic actuator system is shown. The system is the same as that shown in FIG. 1, except that the diverting flow path connects one side of the actuator to the other side in a fluid regeneration circuit.

Figure 6:
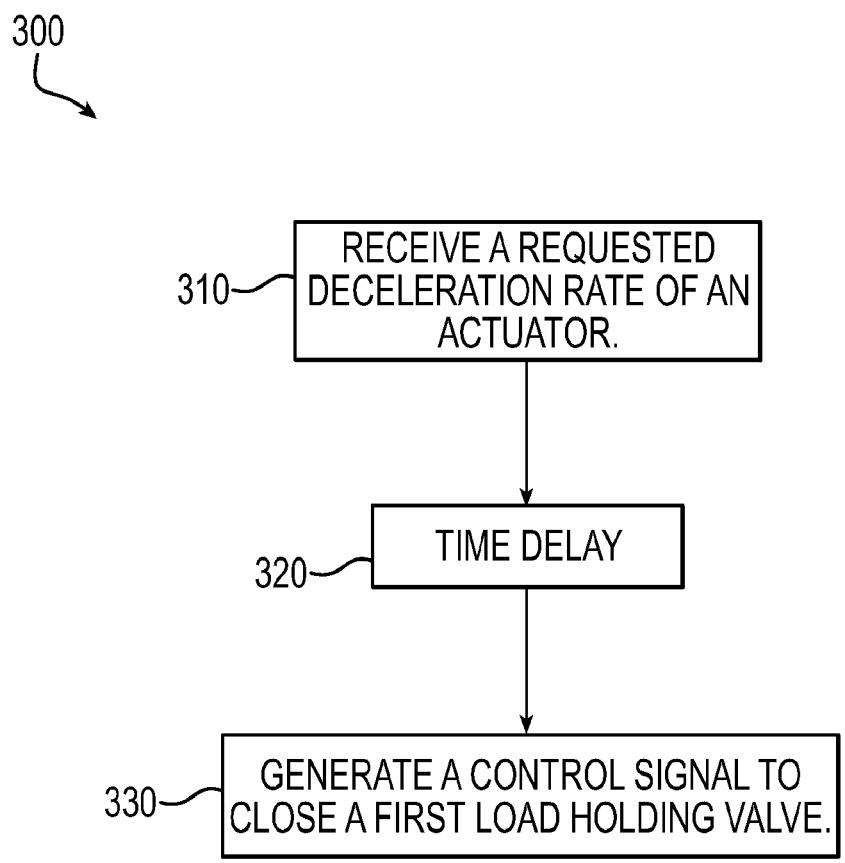
FIG. 6 illustrates an exemplary control method for increasing the capacity of a hydraulic system to decelerate a load.

Above-described embodiments extend the capacity of the system beond the flow capabilities of the pump. Referring now to FIG. 6, presented is a method 300 to control hydraulic fluid flow, more specifically throttle hydraulic fluid flow, to achieve actuator deceleration rates greater than the maximum deceleration rate of an electrically driven pump. The method solves a problem that electric machines and electric machine inverters generally have a maximum torque and current limit beyond which they cannot be operated at. To decelerate a large inertia load for example, high electric machine torque and inverter current are required to provide the braking torque, opposing the fluid flow and pressure generated by the load and hydraulic system. While an alternate approach could be to increase the electric machine torque capability and the inverter current capability, it is typically desirable to reduce electric machine and inverter size in order to reduce component size, weight, losses and cost.

The method addresses three main issues. First, the method achieves actuator deceleration rates greater than maximum inverter, electric machine and hydraulic pump deceleration rates. This is used to achieve higher system response and implement features such as "bucket shake" to shake off excess soil from the bucket, for example. Second, the method reduces electrical braking current and energy recuperation when external loads are decelerated using an electro-hydrostatic actuator system by shifting the balance between electrical recuperation and hydraulic dissipation. This can be used to prevent large electrical current within the electric machine, inverter and electrical storage unit, for example. Finally, the method provides a fail-safe in cases in which the pump system (which may include the pump and any components used in the operation of the pump such as the inverter, electric machine, etc.) may fail partially or completely.

At block 310, a requested deceleration rate of an actuator is received by a controller, for example, by a joystick manipulated by a user of the work machine. In particular, a user may indicate that a manipulator arm should stop suddenly by quickly moving a joystick from a fully engaged position to a middle, or "at rest" position. Alternatively, perhaps a dedicated button is depressed which indicates a pre-set movement such as a "shake."

At block 320 a time-delay is introduced to allow the pump to begin to decelerate the load. The time delay length may be a set value, or may be determined by one or more factors including sensor signals, pump type, pump wear, requested deceleration rate, load, etc.

At block 330, a control signal to close a first load holding valve is generated. In cases in which the load holding valve is an ON/OFF valve, the generated command may be a simple command to close the valve. In cases where the load holding valve is a proportional valve, the generated command may be a "full close" command, or it may be a proportional command to partially close the valve, or it may be a variable signal that closes the valve at a determined close rate. Further, ON/OFF valves may be selected and tuned so as to mimic a proportional valve by closing relatively slowly.

In cases where a proportional valve is used, the controller will determine the speed and/or degree of closure of the valve based on the requested deceleration and upon the deceleration caused by the pump/motor. Typically, the motor and the valves are, therefore, controlled in parallel, however, the valves may be used on their own in extreme stop ratios or in cases of failure in the pump and/or motor.

Further, as mentioned above in relation to system 100, both load holding valves 107 and 108 may be controlled at the same time, for example to minimize rebound in a case in which the second valve does not include a check feature. Other benefits in such a case may include protecting the pump and/or motor from blowing out. In contrast, the second load holding valve, regardless of whether it includes a check feature, could be opened on a quick stop in order to achieve active damping of the system.

In one example, methodologies are implemented as processor executable instructions or operations provided on a computer-readable medium. Thus, in one example, a computer-readable medium may store processor executable instructions operable to perform a method.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

The methods described herein may be implemented at least partially in software. "Software," as used herein, includes but is not limited to, one or more computer or processor instructions that can be read, interpreted, compiled, or executed and that cause a computer, processor, controller or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Java Script, Java.NET, ASP.NET, VB.NET, Cocoa, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic system comprising:
    a controller connectable to an operator interface for receiving an operator input;
    a pump system including a pump operable in a first direction for supplying pressurized fluid;
    a hydraulic circuit having a first side fluidly connecting a first side of the pump to a first port to which a first port of a consumer can be connected and providing a path for flow between the port and the pump, and a second side fluidly connecting the second side of the pump to a second port to which a second port of the consumer can be connected; and a diverting flow path including a variable restriction controlled by the controller for controlling a rate of flow through the first side of the hydraulic circuit, wherein the diverting flow path diverts at least a portion of flow in the first side of the hydraulic circuit away from the pump, wherein the controller is configured to receive a requested user command from the operator interface, to evaluate the user command in relation to a maximum capacity of the pump system in response to the requested user command, and to control the pump and variable restriction to implement the user command based on the evaluation, and wherein the maximum capacity of the pump system is a maximum storage rate or a maximum storage capacity of an electrical storage system of the pump system that is operatively connected to the pump and is configured to recuperate energy from the pump being operated by an external load, and wherein the variable restriction is opened in response to an evaluation in which the user command indicates a desired consumer movement corresponding to a storage rate or storage capacity greater than the maximum storage rate or maximum storage capacity of the electrical storage system.

2. The hydraulic system of claim 1, wherein the diverting flow path fluidly connects the first port to the second port.

3. The hydraulic system of claim 1, wherein the diverting flow path fluidly connects the first port to a boost system.

4. The hydraulic system of claim 1, wherein the diverting flow path fluidly connects the first port to tank.

5. The hydraulic system of claim 1, further comprising valving fluidly connected between the pump and the ports, the valving controlled by the controller and operative to regulate the pressurized fluid between the pump and the consumer.

6. The hydraulic system of claim 1, wherein the valving includes a first load holding valve disposed between the first port and the pump, and a second load holding valve disposed between the second port and the pump.

7. The hydraulic system of claim 6, wherein the diverting flow path is fluidly parallel with and thereby bypasses the first load holding valve.

8. The hydraulic system of claim 6, wherein the diverting flow path is fluidly parallel with and thereby bypasses the second load holding valve.

9. The hydraulic system of claim 1, wherein the user command is a command for lowering an actuator.

10. The hydraulic system of claim 1, wherein the pump is a bi-directional pump operable in a first direction for supplying pressurized fluid through the first valve to the consumer for operating the consumer in one direction, and operable in a second direction opposite the first direction for supplying pressurized fluid through a second valve to the consumer for operating the consumer in a direction opposite the first direction.

11. The hydraulic system of claim 1, further comprising: a hydraulic actuator to and from which hydraulic fluid is supplied and returned in opposite directions to operate the actuator in opposite directions.

12. The hydraulic system of claim 1, further comprising: a boost system for accepting fluid from or supplying fluid to the hydraulic circuit of the hydraulic system, wherein the boost system includes:
a boost pump for supplying fluid to a fluid make-up/return line that selectively is in fluid communication with the consumer, and a boost electric machine for driving the boost pump, the electric machine connected to a boost electric power source through a boost inverter.

13. The hydraulic system of claim 1, further comprising: an electric machine operated by the controller and connected to an electrical source through an inverter to drive the pump.

14. A method of controlling fluid flow through a pump in an electro-hydraulic system, the method comprising the steps of:
receiving a requested user command for a consumer;
evaluating the user command in relation to a maximum capacity of the an electro-hydraulic system in response to the requested user command;
diverting flow around the pump to implement the user command based on the evaluation via a variable restrictor of a diverting flow path, and
wherein the maximum capacity of the electro-hydraulic system is a maximum storage rate or maximum storage capacity of an electrical storage system of the electro-hydraulic system that is operatively connected to the pump and is configured to recuperate energy from the pump being operated by an external load, and wherein the diverting is in response to an evaluation in which the user command indicates a desired consumer movement corresponding to a storage rate or storage capacity greater than the maximum storage rate or maximum storage capacity of the electrical storage system.

15. The method of claim 14, wherein the electro-hydraulic system includes a first side fluidly connecting a first side of the pump to a first port to which a first port of a consumer can be connected and providing a path for flow between the port and the pump, and a second side fluidly connecting the second side of the pump to a second port to which a second port of the consumer can be connected; and
wherein the diverting includes fluidly connecting the first port to the second port.

16. The method of claim 14, wherein the electro-hydraulic system includes a first side fluidly connecting a first side of the pump to a first port to which a first port of a consumer can be connected and providing a path for flow between the port and the pump;
wherein the diverting includes fluidly connecting the first port to a boost system.

17. The method of claim 14, wherein the electro-hydraulic system includes a first side fluidly connecting a first side of the pump to a first port to which a first port of a consumer can be connected and providing a path for flow between the port and the pump;
wherein the diverting includes fluidly connecting the first port to tank.

18. The method of claim 14, wherein the user command is a command for lowering an actuator.

19. The method of claim 14, wherein the electro-hydraulic system includes a first side fluidly connecting a first side of the pump to a first port to which a first port of a consumer can be connected and providing a path for flow between the port and the pump;
wherein the consumer is a hydraulic cylinder and the first side of the electro-hydraulic system is fluidly connected to a rod-side of the hydraulic cylinder.

20. The method of claim 14, wherein the consumer includes a hydraulic actuator, and wherein the pump is a bi-directional pump operable in a first direction for supplying pressurized fluid through a first valve to the hydraulic actuator for operating the consumer in one direction, and operable in a second direction opposite the first direction for supplying pressurized fluid through a second valve to the hydraulic actuator for operating the consumer in a direction opposite the first direction.

21. The method of claim 14, wherein the consumer is a hydraulic actuator to and from which hydraulic fluid is supplied and returned in opposite directions to operate the actuator in opposite directions.

22. The method of claim 14, further comprising:
accepting fluid from or supplying fluid to a hydraulic circuit of the electro-hydraulic system via a boost system,
wherein the boost system includes:
a boost pump for supplying fluid to a fluid make-up/return line that selectively is in fluid communication with the hydraulic actuator, and a boost electric machine for driving the boost pump, the electric machine connected to a boost electric power source through a boost inverter.

23. The method of claim 14, wherein the electro-hydraulic system includes a first side fluidly connecting a first side of the pump to a first port to which a first port of a consumer can be connected and providing a path for flow between the port and the pump, and a second side fluidly connecting the second side of the pump to a second port to which a second port of the consumer can be connected, and
further comprising controlling valving fluidly connected between the pump and the ports to regulate the pressurized fluid between the pump and the consumer.

24. The method of claim 14, wherein the electro-hydraulic system includes a first side fluidly connecting a first side of the pump to a first port to which a first port of a consumer can be connected and providing a path for flow between the port and the pump, and a load-holding valve connected between the pump and the first port, the load-holding valve controlled by a controller and operative in a first position to allow flow to the consumer to operate the consumer against a load and operative in a second position to block load-induced return flow from the actuator to the pump.

25. The method of claim 14, further comprising:
operating the pump in one direction for supplying pressurized fluid to the consumer for operating the consumer in a first direction, and operating the pump in a second direction opposite the first direction for supplying pressurized fluid to the consumer for operating the consumer in a direction opposite the first direction.

26. The method of claim 14, further comprising:
driving the pump via an electric machine connected to an electrical source through an inverter.

27. A hydraulic system comprising:
a pump system including a pump operable in a first direction for supplying pressurized fluid;
a hydraulic circuit having a first side fluidly connecting a first side of the pump to a first port to which a first port of a consumer can be connected and providing a path for flow between the port and the pump, and a second side fluidly connecting the second side of the pump to a second port to which a second port of the consumer can be connected; and
a diverting flow path including a variable restriction for controlling a rate of flow through the first side of the hydraulic circuit, wherein the diverting flow path diverts at least a portion of flow in the first side of the hydraulic circuit to tank,
wherein the variable restriction is variable as a function of a sensed system parameter, and
wherein a maximum capacity of the pump system is a maximum storage rate or maximum storage capacity of an electrical storage system of the pump system that is operatively connected to the pump and is configured to recuperate energy from the pump being operated by an external load, and wherein the variable restriction is opened in response to an evaluation in which the user command indicates a desired consumer movement corresponding to a storage rate or storage capacity greater than the maximum storage rate or maximum storage capacity of the electrical storage system.

28. The hydraulic system of claim 27, wherein the diverting flow path fluidly connects the first port to tank via a boost system.

29. The hydraulic system of claim 27, wherein the diverting flow path fluidly connects the first port directly to tank.

30. The hydraulic system of claim 27, further comprising:
a controller connected to an operator interface;
wherein the controller is configured to receive a requested user command, to evaluate the user command in relation to the maximum capacity of the pump system in response to the requested user command, and to control the pump and variable restriction to implement the user command based on the evaluation.

31. The hydraulic system of claim 27, further comprising valving fluidly connected between the pump and the ports, the valving controlled by the controller and operative to regulate the pressurized fluid between the pump and the consumer.

32. The hydraulic system of claim 27, wherein the valving includes a first load holding valve disposed between the first port and the pump, and a second load holding valve disposed between the second port and the pump.

33. The hydraulic system of claim 32, wherein the diverting flow path is fluidly parallel with and thereby bypasses the first load holding valve.

34. The hydraulic system of claim 32, wherein the diverting flow path is fluidly parallel with and thereby bypasses the second load holding valve.

35. The hydraulic system of claim 32, wherein the pump is a bi-directional pump operable in a first direction for supplying pressurized fluid through the first load holding valve to the consumer for operating the consumer in one direction, and operable in a second direction opposite the first direction for supplying pressurized fluid through the second load holding valve to the consumer for operating the consumer in a direction opposite the first direction.

36. The hydraulic system of claim 27, wherein the user command is a command for lowering an actuator.

37. The hydraulic system of claim 27, further comprising:
a hydraulic actuator to and from which hydraulic fluid is supplied and returned in opposite directions to operate the actuator in opposite directions.

38. The hydraulic system of claim 27, further comprising:
a boost system for accepting fluid from or supplying fluid to the hydraulic circuit of the hydraulic system,
wherein the boost system includes:
a boost pump for supplying fluid to a fluid make-up/return line that selectively is in fluid communication with the consumer, and a boost electric machine for driving the boost pump, the electric machine connected to a boost electric power source through a boost inverter.

39. The hydraulic system of claim 27, further comprising:
an electric machine operated by the controller and connected to an electrical source through an inverter to drive the pump.

* * * * *